June 17, 1930. E. J. LEVY 1,763,802
THERMOSTAT
Original Filed May 26, 1927
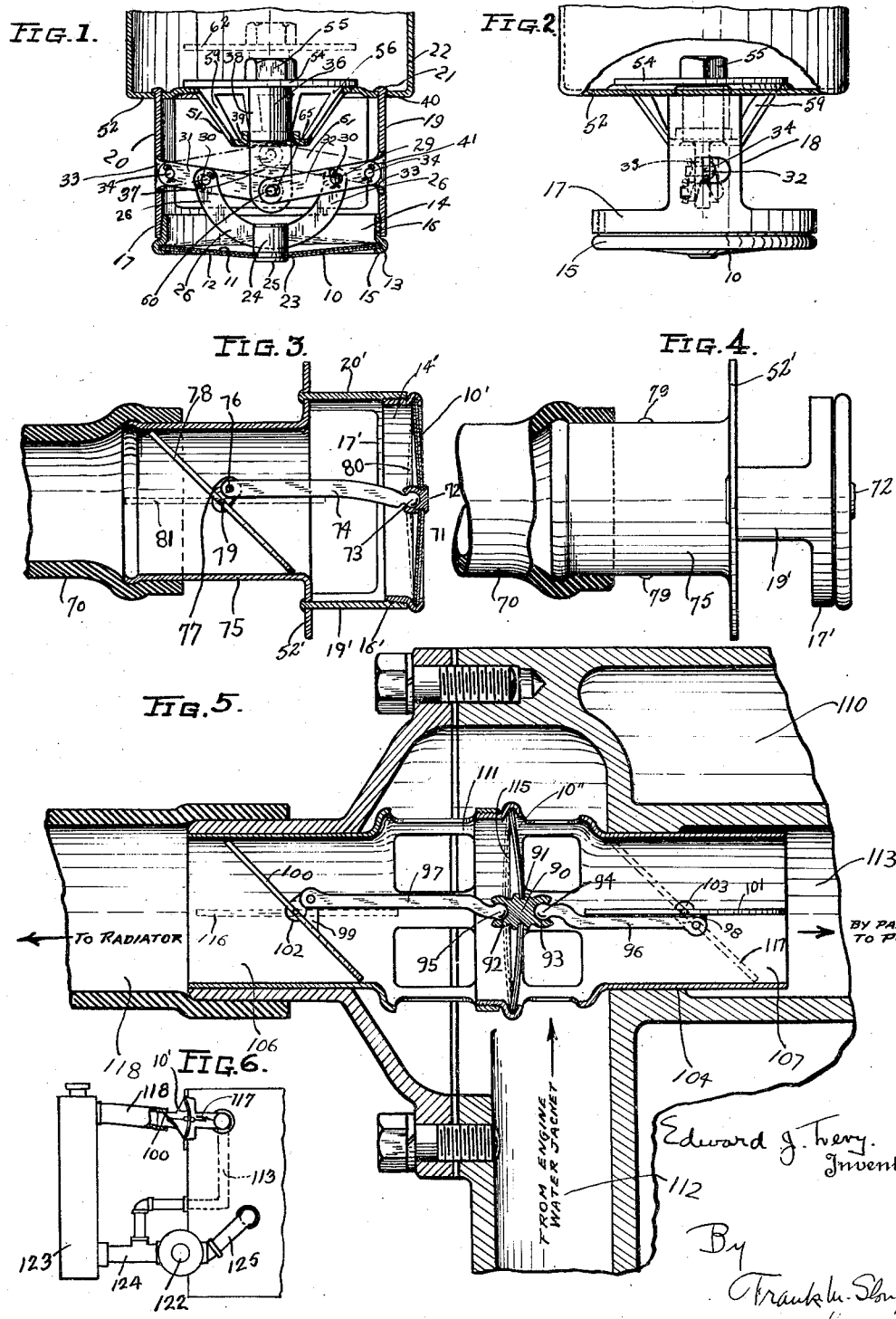

Patented June 17, 1930

1,763,802

UNITED STATES PATENT OFFICE

EDWARD J. LEVY (NOW BY JUDICIAL CHANGE OF NAME EDWARD LEVY MAYO), OF CLEVELAND, OHIO, ASSIGNOR TO THE BISHOP & BABCOCK MANUFACTURING COMPANY, OF CLEVELAND, OHIO, A CORPORATION OF OHIO

THERMOSTAT

Application filed May 26, 1927, Serial No. 194,276. Renewed October 27, 1928.

My invention relates to temperature controlled devices for controlling the flow of fluids and more particularly it relates to improvements in thermostatically actuated valves, and the like.

Prior thermostatically controlled devices, with which I am familiar, for actuating valves, and the like, of a size sufficient to control the flow of fluids in a passage of relatively large area and capacity have required thermostat elements of large size, and considerable cost. Also the motive effort imparted to the valves has been gradually applied and is often of subordinate effect compared to the resulting fluid pressure changes effected by slight movement of the valve from or toward closed position.

My invention aims to overcome these deficiencies of the prior thermostatically controlled valve mechanisms, by the provision of a thermo-responsive element capable of communicating a powerful motive effort to the valve, the resulting motion being capable of multiplication, whereby a valve may be moved sufficiently to quickly close a relatively large valve port without the possibility of having the action materially altered by the varying pressure of fluids adapted to pass through the valve.

An object, therefore, of my invention resides in the provision of a thermostatically actuated valve wherein the thermo-responsive actuating element, merely by a relatively short "snap" movement, is capable of communicating powerful multiplied motion to a valve to effect positive opening and closing of a valve port.

Another object of my invention resides in the provision of a thermo-responsive valve actuating device which is durable, simple in construction, positive in operation to effect the desired result, economical to manufacture, and which may be expeditiously assembled.

These and other objects of my invention and the invention itself will become apparent from reference to the following description of an embodiment thereof, and in which description reference will be had to the annexed drawings thereof forming a part of this specification.

Referring to the drawings:

Fig. 1 is a vertical sectional view of an embodiment of my invention, some of its parts being shown in elevation;

Fig. 2 is an elevational view of the same, a portion thereof being broken away to more clearly illustrate the same;

Fig. 3 is a longitudinal sectional view of another embodiment of my invention, some of its parts being illustrated in elevation;

Fig. 4 is an elevational view of the embodiment of Fig. 3; and

Fig. 5 is a longitudinal sectional view of still another embodiment of my invention employed in connection with the cooling system of an internal combustion engine, a fragment being shown in section; Fig. 6 is a diagrammatic view of a system employing the embodiment of Fig. 5.

Referring first to Figs. 1 and 2 of the drawings, in which like parts are designated by like reference characters, and wherein I illustrate an embodiment of my invention, at 10, I show a composite thermo-responsive-bi-metallic element, comprising a pair of superposed metallic disks 11 and 12 of dissimilar metal intimately joined together at their contiguous surfaces, each having different coefficients of expansion, and the element having a non-developable depression disposed preferably adjacent its mid-portion. The composite element 10 is mounted with its periphery projected into an annular internal groove 13 formed in the supporting tube 14, the end of the tube being inturned at 15 to retain the element in place.

The tube 14 is internally threaded, at 16, for engagement with the interiorly threaded portion 17 of a tubular skeleton frame 18, longitudinal adjustment of the element relative thereto being thereby had. The frame comprises a plurality of arms 19 and 20 depending from the frame portion 17, provided with reduced ends 21, insertable in apertures through the wall 40 of a conduit 22, the ends 21 thereof being upset to secure the frame to the conduit.

The central portion of the element 10 is apertured at 23 to receive a rod 24, secured to the disks as by upsetting the end thereof shown at 25. The rod 24 extends longitudinally within the skeleton frame 18 and supports an arcuate element 26 attached by its mid-portion thereto, its ends being apertured as shown at 29 adjacent its outer ends for the reception of pins 30, each providing a pivoted connection for a pair of toggle links 31 and 32. Elongated apertures 65 are formed in the links adjacent their outer ends, to receive the ends of a pin 60 extending through the flattened end 37 of a valve stem 36; a toggle mechanism is thus formed for imparting motions from the element 10 through the agency of the rod 24, the element 26, and the links 31 and 32, said links caused to swing on their pivots 34. The slots 65 for the links are disposed on opposite sides of the valve stem which is disposed substantially axially of the skeleton frame.

Lugs 33 are projected from the arms 19 and 20 of the frame, pins 34 being supported thereby to pivotally support the links 31 and 32. Cotter pins 41 retain the links on the pins.

The skeleton frame 18 is secured by the ends 21 of the arms 19 and 20 to the end wall 52 of a conduit 22. The end wall 52 provides a valve port 56 and conveying spider arms 59 projected from the end wall into the interior of the skeleton frame 18 to provide an annular bearing 39 for the cylindrical outer surface 38 of the valve rod 24 to keep the rod in axial alignment with the port 56. To the end of the portion 38 of the valve stem 36 is secured a disk valve 54, by a hexagon nut 55, threaded into the end of the stem. The valve is of greater diameter than the port 56, sufficient to bridge the valve port to close the same when moved into engagement with the wall 52 of the conduit.

Upon movement of the thermo-responsive element, to a position indicated by dotted lines at 61, the stem will be reciprocated in its bearing, and, by motion communicated by the arms 26 and levers 31 and 32, the valve will be shifted to the open position indicated by dotted lines at 62.

The disk 10 being formed substantially as described in the patent to Spencer, No. 1,448,240, dated March 13, 1923, and having within its border a centrally disposed non-developable depression, causing it to take the position indicated in Fig. 1, upon a predetermined change in temperature of the fluid in which the element 10 is immersed, the disks 11 and 12 comprising the element 10 will be affected unequally as to their expansion or contraction and, according to the teachings of the said Spencer patent, will finally snap to the dotted line position 63, Fig. 1, and will effect a movement of the valve 54 to the dotted line position of Fig. 1, the movement of the valve being greater than that of any portion of the element 10 because of the multiplying power of the levers 31 and 32 in the toggle mechanism joining the valve 54 and element 10. The valve port will therefore be opened and fluid may pass therethrough between the arms 51 of the bearing supporting spider and between the arms 19 and 20 of the skeleton frame supporting the element 10. Such a flow of fluid may effect a reversal in temperature of the element 10 with a resultant snap movement in the opposite direction toward solid line valve-closing position, shown in the drawing of Fig. 1.

While I have shown the poppet valve operating mechanism mounted in a particular way relative to the conduit 22 of Figs. 1 and 2, the mounting and form of this mechanism may be varied, one form being only shown for purpose of illustrating my invention as applied to a poppet valve mechanism.

I find that the motive effort supplied by the snapping of the bi-metallic element 10 from its one form or position to its alternative form or position, is of considerable power, and therefore, although the valve is moved a greater distance than any part of the element 10, yet the movement is effected positively and with sufficient power that any restraining effort exerted by the pressure of fluid will be positively overcome, thus distinguishing the mechanism of my present invention from mechanisms operated by the ordinary bellows type of thermostats in which, responsive to an initial valve-opening position, the resultant change in fluid pressure upon the valve often effects a chattering of the valve.

Referring now to the embodiment of my invention illustrated in Figs. 3 and 4, the arrangement of bi-metallic element 10' and skeleton tubular frame is very similar to that of the embodiment described above, the element 10' being supported in a ring 14' screw-threaded at 16' to an annular portion 17' of the skeleton frame, having supporting lateral arms 19' and 20' affixed by its ends to an annular flange 52' of a conduit 75. In the conduit 75 is pivoted, at 79, a butterfly valve element 78 having a bifurcated short arm 77 rigidly secured to its mid portion.

Motion is communicated from the button 72, affixed to the center of the bi-metallic disk 10', to the butterfly valve by a connecting rod 74, making a ball and socket joint with the button 72 by its spherical end 73 fitting within a spherical recess of the button, the connecting rod being pivoted at 76 between the forks of the bifurcated arm 77 by a pin passing through the forks and the end of the rod.

From the foregoing, the action of this embodiment of my invention will be well understood, variations in temperature altering the form of the bi-metallic element 10' to cause its central portions to take the alternative solid line and dotted line positions, the latter being shown at 80, and, by the multiplying effect of the lever comprising the bifurcated arm 77, the butterfly valve is moved from its solid line position to the dotted line position, indicated at 81, wherein fluid may freely be communicated from a conduit 70 affixed to the end of the conduit 75, past the butterfly valve and outwardly from the conduit through the openings provided between the spaced arms 19' and 20' of the so-called skeleton frame.

Referring to Fig. 5 of the drawings, I have illustrated a third embodiment of my invention and have depicted the same as applied to the cooling system of an internal combustion engine, the present embodiment being substantially similar to the embodiment of Figs. 3 and 4 in construction and operation except that, in the place of a single pivoted valve, I contemplate employing a pair of pivoted valves adapted for varying the flow of fluid simultaneously in a plurality of conduits. A single thermo-responsive element 10'', for simultaneously actuating a pair of valve elements 100 and 101, such as disk butterfly valves, is employed. A metallic button 90 is secured centrally to the thermo-responsive element 10'' and is provided with oppositely disposed parti-spherical recesses 92 and 93, adapted for the reception of the ball-shaped ends 94 and 95 of oppositely extending links 96 and 97, to provide a universal joint connection between the links and the thermo-responsive element. The links make pivoted connection with integral lugs 98 and 99 of the butterfly valves 100 and 101, close to the axis of the valve pivots 102 and 103. Thus the powerful but relatively slight movements of the button 90 are communicated to the valves 100 and 101, but considerably increased in amplitude, whereby the valves are moved towards open and closed position sufficiently to freely permit the flow of fluid in the different conduits of the system, according to the temperature of the fluid contained therein.

The apparatus of Fig. 5 applied to the cooling system of an internal combustion engine and the temperature of the cooling fluid contained in the water jacket 110 to be at a lower temperature than at which the engine operates most efficiently, the thermostatic fluid control mechanism generally indicated at 111 will assume the position indicated in full lines, the cooling fluid flowing from the engine jacket disposed around the various cylinders of the engine and through the passage 112, valve 101 and passage 113, downwardly through the conduit 121 to the pump 122, Fig. 6, whence it is again circulated about the water jacket of the engine. The passage 113 is preferably cored in the engine block casting and extends therein downwardly to join with an exterior conduit portion leading to the inlet side of the pump. When the temperature of the water reaches a predetermined high temperature, the concavo-convex thermo-responsive element 10'' will increase its warping tendency until the unequal stresses set up on its two sides cause it to snap into the reversely concaved form, indicated in dotted lines at 115. The butterfly valves 100 and 101 will thereby be moved from the full line position into the dotted line position 116 and 117, to permit fluid to flow from the water jacket 110, through the passage 112, valve 100 and conduits 106 and 118, to the radiator 123, to effect cooling of the water, which is returned to the engine jacket through conduit 124, pump 122, and conduit 125.

When the temperature of the cooling fluid has been cooled to a desired predetermined degree, the element 10'', due to reverse stresses set up by differential expansive effects upon its two component integrally joined disks, will be gradually forcibly warped until suddenly it will snap into the form shown in full lines in the drawing; the valve 100 will be reclosed and the valve 101 will be reopened, respectively, again effecting the flow through the system exclusive of the radiator. The thermostatic element is moved with such force and power as to operate the valves rapidly and positively and without effective interference by the effects of fluid pressure, to effect the flows desired through the engine jacket and radiator.

In each of the foregoing embodiments, the thermostatic elements are preferably so adjusted relative to positioning of the valves, that when a valve is moved to its completely closed position, by the action of the element snapping to one of its alternative concavo-convex forms, after seating, the valve will be continually pressed toward closed position by the resilient effort of the thermostatic element, tending to take a more dished form than it is capable of taking, because of the restraint exercised upon it by the engagement of the valve with the walls of the conduit when the valve is in closed position. The natural inherent resiliency of the thermostatic elements of the type herein described, under such a condition, permits restraint preventing the elements reaching their ultimate alternative concavo-convex forms, there being a distribution of the stresses in portions of the elements, whereby an element may effect a spring pressure upon the valve, holding it to closed position until the stresses thus set up are eliminated and subsequently reversed in direction by changed thermal effects of the fluid upon the elements.

From the foregoing, it will be seen that the valves may be maintained in closed position by spring pressure inherent in the thermostatic elements, and this may be made sufficient in power to overcome unseating effort which may be effected by fluid pressure tending to unseat the valves.

Having thus described my invention in certain specific embodiments, I am aware that numerous and extensive departures may be made from the embodiment herein illustrated and described, without departing from the spirit of my invention.

I claim:

1. In a thermostatic valve mechanism, the combination with a conduit, a valve therein controlling the flow of fluids therethrough, a thermostat element comprising a composite metallic sheet having a non-developable depression adapted to suddenly change its form with a "snap" action upon a predetermined change of its temperature, said conduit having passages therethrough adapted to convey fluid at substantially the same pressure simultaneously to both surfaces of the sheet and a lever connection between the valve and element for communicating multiplied "snap" movements of the element to the valve to move the same, and means adapted to stop the movement of the vale before the element has reached its otherwise ultimate form to effect continued spring pressure derived from the inherent resiliency of the element.

2. In a fluid system an internal combustion engine cooling jacket, a cooling radiator, a pump, conduits serially inter-connecting the jacket, radiator and pump, a thermostat comprising a tubular skeleton frame and a composite metallic sheet formed by a pair of superposed metal sheets intimately secured face to face, the material of the secured sheets having different coefficients of thermal expansion, said thermostat sheet secured to walls of the frame within the jacket, said frame providing fluid passages through its walls to communicate fluid in the conduit at substantially the same pressure, simultaneously to the two sides of the sheet to balance the sheet to the effects of fluid pressure in the conduit, a by-pass conduit leading from the thermostat adapted to divert water from the radiator, a pair of valves, one disposed to close the conduit on the radiator side of the thermostat, the other disposed to close the by-pass conduit, a common element for said thermostat, operable thereby to actuate both said valves to alternately opened or closed positions, said element operable by a bodily movement of a portion of said thermostat upon a predetermined change of temperature independently of fluid pressure effective on its exterior surfaces.

3. In a temperature regulating mechanism for water jacketed internal combustion engines, a self-contained thermostatic valve mechanism comprising a flanged tubular outlet casing secured by its flange to the jacket head, a tubular support for the valve mechanism telescoped within the tubular outlet with the outer walls thereof closely engageable with the inner walls of the outlet, said tubular support providing by its bore a fluid passage, a valve in the passage, and a thermostat so carried by a projection of the support as to project it within the jacket walls when the support and outlet are in their assembled positions relative to the jacket.

4. A thermostatic valve mechanism comprising a support, a sheet of thermally warpable bi-metallic material, and a butterfly valve secured together as a unit mechanism, said support comprising a tubular portion and an extension projecting longitudinally from said portion, said valve journalled to rotate within said tubular portion on an axis extending transversely to the axis thereof to variably obstruct the passage through said portion, said bi-metallic sheet secured to said extension and having a movable portion joined to said valve near the axis thereof to effect multiplied movement of edges of said valve disposed remote from its axis.

5. In a temperature regulating system for water jacketed internal combustion engines, a self-contained thermostatic valve mechanism adapted to be inserted in the engine jacket to control the flow of water therefrom comprising a tubular support, a valve journalled therein rotatable on an axis extending transversely thereof, a bi-metallic thermally warpable element adapted for disposition entirely in the engine jacket on the fluid pressure side of the valve to expose it to changes of temperature of water in the jacket, and means comprising a longitudinally projecting extension of said tubular element supporting said bi-metallic element between the inner and outer jacket walls, said warpable element adapted when warped responsive to changes of temperature of the water in the jacket to communicate movement to said valve to rotate it entirely independently of the fluid pressure exerted by the water in the jacket thereon.

6. A thermostatic mechanism comprising a tubular conduit element, adapted to be secured to a liquid containing casing to control the flow from a port thereof, a valve pivotally mounted transversely within said conduit element and supported thereby, movable to obstruct or effect the ready flow of fluid from the casing through the conduit, a thermostatic element supported by an end of the casing in substantially axial alignment with the conduit passage, and spaced longitudinally of the conduit element from the pivotal axis of said valve, and an arm extending longitudinally of the conduit element from said thermostat element to said valve to communicate movement of said thermostat element to the vale to pivotally operate it, means connecting the end portion of said arm to said valve, an intermediate portion of said arm being disposed in the arcuate path of movement of said pivotal valve so as to be engaged thereby to form a stop to limit the opening movement of the valve.

7. A thermostatic mechanism comprising a tubular conduit element adapted to be secured to a liquid containing casing to control flow from a port thereof, a valve pivotally mounted transversely within said conduit element and supported thereby, movable to obstruct or effect the ready flow of fluid from the casing through the conduit, a skeleton supporting means carried by an end of said conduit, adapted to support said thermostat element in substantially axial alignment with the conduit passage, and spaced longitudinally of the conduit element from the pivotal axis of said valve, and an arm extending longitudinally of the conduit element from said thermostat element to said valve to communicate movement of said thermostat element to the valve to operate it, means connecting the end portion of said arm to said valve, an intermediate portion of said arm being disposed in the arcuate path of movement of said valve so as to be engaged thereby to form a stop to limit the opening movement of the valve, and means adapted to secure said conduit element to the ported casing wall, adapted to project its supported thermostat, substantially entirely within the casing.

8. A thermostatic mechanism comprising a tubular conduit element adapted to be secured to a liquid containing casing to control flow therefrom through a port thereof, a valve pivotally mounted transversely within said conduit element and supported thereby, movable to obstruct or effect the ready flow of fluid from the casing through the conduit, a skeleton supporting means carried by an end of said conduit, adapted to support said thermostat element in substantially axial alignment with the conduit passage, and spaced longitudinally of the conduit element from the pivotal axis of said valve, and an arm extending longitudinally of the conduit element from said thermostat element to said valve to communicate movement of said thermostat element to the valve to operate it, means connecting the end portion of said arm to said valve, said connection means comprising a crank arm extending from the intermediate portion of the valve, and means for making a cranking connection between said crank arm and said motion communicating arm end.

9. In a temperature regulating system a self-contained thermostatic valve mechanism adapted to be interposed as a unit in a water line comprising a tubular support, a valve disposed within the tubular support and swivelable therein to control the flow of water therethrough, a thermostat disposed substantially in alignment with the longitudinal axis of the support also carried by the tubular support, an arm extending longitudinally within the tubular support and making connection between a movable portion of said thermostat and said valve, closely adjacent its swiveling axis whereby said valve is operated upon changes of temperature of said thermostat, said valve when swivelled to an extreme opened position engaging another portion of said arm to limit the opening movement thereof.

10. A unitary thermostatic mechanism adapted to be removably insertable in a water line to variably control the flow of water inversely commensurably with the temperature thereof, comprising a tubular casing, a butterfly valve pivoted in the casing, a thermostat supported by the casing spaced longitudinally thereof from said valve, and disposed in substantially longitudinal alignment with the axis of the casing and having its exterior surface entirely freely exposed to the water located entirely at one side of said valve, means connecting said thermostat to said valve at a point closely adjacent its axis near the longitudinal axis of the casing, and means for removably securing said unitary mechanism to a water conduit.

11. A thermostatic mechanism removably insertable as a unit in a water line, comprising a tube, a butterfly valve pivoted therein, a thermostat supported thereby substantially in alignment with the longitudinal axis of the tube, said thermostat adapted to rotate said valve about an axis extending transversely of the tube upon changes of temperature of water, said thermostat disposed entirely at one side of said valve.

12. A thermostatic mechanism removably insertable as a unit in a water line, comprising a tube, a butterfly valve pivoted therein to rotate on an axis extending transversely thereof, a thermostat supported thereby substantially in alignment with the longitudinal axis of the tube, a link for communicating motion from said thermostat to said valve, interconnecting a movable portion of the thermostat and said valve joined to the valve closely adjacent its axis of rotation, said thermostat disposed entirely at one side of said valve.

13. A thermostatic mechanism comprising a tubular conduit, a butterfly valve mounted in the conduit to pivot on an axis extending transversely thereof, a thermostat supported by an end of the conduit in substantially axial alignment with the passage through the conduit and spaced longitudinally of the conduit from the said valve, an arm extending longitudinally of the conduit from a movable portion of the thermostat to said valve to communicate actuating movement from the thermostat to the valve, means pivotally connecting an end of said arm to the valve closely adjacent its axis, said arm disposed for engagement by a portion of the valve when rotated thereby to limit the conduit opening movement of the valve.

In testimony whereof I hereunto affix my signature this 3rd day of May, 1927.

EDWARD J. LEVY.

DISCLAIMER 1,763,802.—*Edward J. Levy* (now by judicial change of name *Edward Levy Mayo*), Cleveland, Ohio. THERMOSTAT. Patent dated June 17, 1930. Disclaimer filed November 13, 1939, by the assignee, *The Bishop & Babcock Mfg. Company*.

Hereby enters this disclaimer to claims 8, 10, and 12 of said patent.
[*Official Gazette December 12, 1939.*]